US007473202B2

(12) United States Patent
Morscheck et al.

(10) Patent No.: US 7,473,202 B2
(45) Date of Patent: Jan. 6, 2009

(54) CONTINUOUSLY VARIABLE DUAL MODE TRANSMISSION

(75) Inventors: Timothy J. Morscheck, Portage, MI (US); Alan C. Stine, Kalamazoo, MI (US); Joseph D. Reynolds, Climax, MI (US); James L. Oliver, Orion, MI (US)

(73) Assignee: Eaton Corporation, Cleveland, OH (US)

( * ) Notice: Subject to any disclaimer, the term of this patent is extended or adjusted under 35 U.S.C. 154(b) by 268 days.

(21) Appl. No.: 11/390,356

(22) Filed: Mar. 27, 2006

(65) Prior Publication Data

US 2006/0234822 A1 Oct. 19, 2006

Related U.S. Application Data

(60) Provisional application No. 60/671,917, filed on Apr. 15, 2005.

(51) Int. Cl.
*F16H 37/02* (2006.01)
(52) U.S. Cl. .................................... 475/208
(58) Field of Classification Search .................. None
See application file for complete search history.

(56) References Cited

U.S. PATENT DOCUMENTS

| | | | | | |
|---|---|---|---|---|---|
| 3,385,132 | A | * | 5/1968 | Browning | 475/138 |
| 4,553,450 | A | * | 11/1985 | Gizard | 475/212 |
| 5,669,846 | A | * | 9/1997 | Moroto et al. | 475/211 |
| 5,803,858 | A | | 9/1998 | Haka | |
| 5,888,161 | A | | 3/1999 | McCarrick | |
| 5,916,053 | A | | 6/1999 | McCarrick | |

(Continued)

FOREIGN PATENT DOCUMENTS

DE 199 39 192 A1 4/2000

(Continued)

OTHER PUBLICATIONS

PCT Search report dated completed Aug. 8, 2006, Application No. PCT/IB2006/000873.

(Continued)

*Primary Examiner*—Dirk Wright
(74) *Attorney, Agent, or Firm*—Kevin M. Hinman

(57) ABSTRACT

A dual mode continuously variable transmission for use with motor vehicles includes a transmission input shaft, a transmission output shaft, and a variator disposed between the transmission input shaft and the transmission output shaft. A mixer gear set is operably disposed between the transmission input shaft and the variator output shaft. A clutching element is operably disposed between the input shaft the mixer gear set. The variator is configured to continuously vary a ratio of input torque to output torque between the variator shafts responsive to commands from an electronic control unit. The variator input shaft is drivingly connected to the input shaft and the variator output shaft is drivingly connected to the output shaft. The clutching element selectively connects and disconnects the input shaft and the mixer gear set to operate the transmission in a power splitting mode of operation and a variator only mode of operation. An electronic control unit incorporates logic rules by which the clutching element maintains the transmission in a variator-only mode of operation in a first vehicle speed range, and maintains the transmission in a power splitting mode of operation in a second vehicle speed range greater than the first vehicle speed range.

4 Claims, 6 Drawing Sheets

U.S. PATENT DOCUMENTS

| | | |
|---|---|---|
| 5,931,760 A | 8/1999 | Beim |
| 5,937,711 A | 8/1999 | McCarrick |
| 5,941,789 A | 8/1999 | McCarrick |
| 5,961,414 A | 10/1999 | Beim |
| 6,001,042 A | 12/1999 | Raney |
| 6,036,616 A | 3/2000 | McCarrick |
| 6,093,125 A | 7/2000 | McCarrick |
| 6,217,473 B1 * | 4/2001 | Ueda et al. ................. 475/216 |
| 6,447,422 B1 * | 9/2002 | Haka ......................... 475/211 |
| 6,866,606 B2 * | 3/2005 | Ooyama ..................... 475/216 |
| 6,932,739 B2 * | 8/2005 | Miyata et al. ................. 477/41 |
| 6,986,725 B2 * | 1/2006 | Morscheck ................. 475/210 |
| 7,217,214 B2 * | 5/2007 | Morscheck ................. 475/211 |
| 2002/0094902 A1 | 7/2002 | Pollman |
| 2004/0127321 A1 * | 7/2004 | Morscheck ................. 475/210 |

FOREIGN PATENT DOCUMENTS

| | | |
|---|---|---|
| EP | 0 450 282 A | 10/1991 |
| EP | 0 753 688 A | 1/1997 |

OTHER PUBLICATIONS

"How to Convert a CVT into a IVT" http://cvt.com.sapo.pt/ivt/ivt.htm Jan. 18, 2005, (date printed).

* cited by examiner

CONTINUOUSLY VARIABLE DUAL MODE TRANSMISSION

RELATED APPLICATIONS

This application claims the benefit of U.S. Provisional Application No. 60/671,917, filed Apr. 15, 2005 entitled "Continuously Variable Dual Mode Transmission", which is incorporated herein by reference in its entirety.

FIELD OF THE INVENTION

The present invention relates to continuously variable transmissions or CVTs used to transform torque and speed from initial values on an input side to second values on an output side. In particular, the present invention relates to the use of CVT in a dual mode fashion, where in a first mode, all of the power passes through the CVT and in a second mode, the power is split between the CVT and fixed ratio gear set.

BACKGROUND OF THE INVENTION

Trucks, particularly heavy duty trucks, commonly employ multiple speed counter-shaft type mechanical transmissions having up to at least 18 different torque multiplication ratios. The large number of ratios is needed to enable a fully loaded truck to perform a variety of necessary tasks, including low speed maneuvering in forward and reverse gears as required for moving about freight yards and for loading and unloading tasks, accelerating from a dead stop, accelerating while rolling, maintaining speed while on a grade, and so on. The large number of gears means that there is a frequent need for shifting. Manual gear shifting, as well as the selection of the correct gear, are tasks which require considerable operator experience to consistently execute optimally. Increasingly, transmissions for heavy-duty trucks are being automated. However, even with a large number of ratios, and automated shifting, the engine speed varies with the speed of the vehicle when the vehicle is in a given gear ratio. This means that the engine's operating parameters must be compromised to accommodate the anticipated range of engine operating speeds. An engine that could be tuned to operate at a single engine speed could be tuned to operate much more efficiently. Shifting decreases the operating efficiency of the vehicle, as there can is typically a dip in vehicle speed during the shift when the engine is momentarily disconnected from the drive wheels, and a subsequent need to bring the vehicle back to its target speed.

It is desired to provide a transmission which provides a full ratio coverage, yet minimizes the need for shifting. It is also desirable to provide the engine with a narrower anticipated speed operating range so as to permit the optimization of engine parameters. Continuously variable transmissions or CVTs provide a means of operating a vehicle engine at a continuous speed across a wide range of vehicle speeds. CVT employ a wide variety of variators to achieve the desired continuous variation in torque and speed multiplication. Know variator forms include pump-motor systems, belt or chain and pulley systems, motor-generator systems and others. For a vehicle to get the maximum efficiency benefit of operating its engine at a constant speed, it is important that the variator as efficient as possible. The pulley-chain type variator has been shown to be among the most efficient models. However, pulley chain variators available today generally have a limited torque capacity and, for a heavy duty vehicle such as a commercial truck, would be unable to sustain all of the engine power all of the time. One known approach of the limitations to the use of CVTs employing chain and pulley type variators has been to reduce the duty cycle to which such variators are exposed. This has typically been accomplished by using the variators in a power splitting mode at low or launch speeds to avoid exposing the variator to what is where it is expected to be the maximum level of torque the transmission will see. The transmission will then operate in the variator only mode at higher speeds to provide the desired vehicle speed range coverage. However, for certain applications such as line-haul trucks where the vehicle spends most of its driving time at relatively elevated speeds, operating in the variator only mode for long distances has the undesired effect of reducing fuel economy. It is desired to provide a CVT and a CVT control system which operates the CVT in a power splitting mode at high vehicle speeds.

SUMMARY OF THE INVENTION

The inventive system beneficially provides a CVT and a CVT control system which operates the CVT in a power splitting mode at high vehicle speeds. This is accomplished by operating the vehicle in a variator-only mode at low vehicle speeds, and operating in a power splitting mode at high speeds. This arrangement is particularly beneficial for vehicles which spend extended periods of time operating in the high speed range, as the cumulative loading on the variator is less than if the CVT operated in a variator only mode at high speeds and a power splitting mode at low speeds.

A dual mode continuously variable transmission for use with motor vehicles includes a transmission input shaft, a transmission output shaft, and a variator disposed between the transmission input shaft and the transmission output shaft. A mixer gear set is operably disposed between the transmission input shaft and the variator output shaft. A clutching element is operably disposed between the input shaft the mixer gear set. An electronic control unit is operably connected to the variator and to the clutching element. The variator is configured to continuously vary a ratio of input torque to output torque between the variator shafts responsive to commands from the electronic control unit. The variator input shaft is drivingly connected to the input shaft and the variator output shaft is drivingly connected to the output shaft. The clutching element selectively connects and disconnects the input shaft and the mixer gear set to operate the transmission in a power splitting mode of operation and a variator only mode of operation. The electronic control unit is configured to include logic rules for controlling the transmission. The logic rules include rules by which the clutching element maintains the transmission in a variator-only mode of operation in a first vehicle speed range, and maintains the transmission in a power splitting mode of operation in a second vehicle speed range greater than the first vehicle speed range.

A dual mode continuously variable transmission for use with motor vehicles includes a transmission input shaft, a transmission output shaft, and a variator disposed between the transmission input shaft and the transmission output shaft. A planetary mixer gear set is operably disposed between the transmission input shaft and the variator output shaft. A grounded element is rotatively fixed relative to a transmission housing. A first clutching device is operably disposed between the transmission input shaft and the planetary mixer gear set. The second clutching device is operably disposed between the ring gear and the grounded element. An electronic control unit is operably connected to the variator and to the clutching elements. The variator is configured to continuously vary a ratio of input torque to output torque between the variator shafts responsive to commands from the electronic control unit. The variator input shaft is drivingly connected to the transmission input shaft and the variator output shaft is drivingly connected to the transmission output shaft. The planetary mixer gear set includes a ring gear rotatable about a first axis, a sun gear rotatable about the first axis and drivingly connected to the variator output shaft, and a carrier drivingly connected to the transmission output shaft and rotatable about the first axis with a plurality of planet gears in mesh with both the sun gear and the ring gear. The first clutching device is disposed and configured so as to selectively connect the input shaft with the ring gear to achieve a power splitting mode of operation. The second clutching device is disposed and configured to selectively connect the ring gear and the grounded element to achieve a variator-only mode of operation. The electronic control unit is configured to include logic rules for controlling the transmission, the logic rules including rules by which the clutching element maintains the transmission in the variator-only mode of operation in a first vehicle speed range and maintains the transmission in the power splitting mode of operation in a second vehicle speed range greater than the first vehicle speed range.

A dual mode continuously variable transmission for use with motor vehicles includes a transmission input shaft, a transmission output shaft, a variator disposed between the transmission input shaft and the transmission output shaft, and a planetary mixer gear set operably disposed between the transmission input shaft and the variator output shaft. The variator has a variator input shaft and a variator output shaft and is configured to continuously vary a ratio of input torque to output torque between the variator shafts responsive to commands from an electronic control unit. The variator input shaft is drivingly connected to the transmission input shaft and the variator output shaft is drivingly connected to the transmission output shaft. The planetary mixer includes a ring gear rotatable about a first axis, a sun gear rotatable about the first axis and drivingly connected to the variator output shaft, and a carrier drivingly connected to the transmission output shaft and rotatable about the first axis with a plurality of planet gears in mesh with both the sun gear and the ring gear. A connecting shaft is fixed to the ring gear for unitary rotation therewith. A first clutching device is operably disposed between the connecting shaft and a transmission housing for selectively connecting the connecting shaft to the housing to prevent relative rotation therebetween to thereby achieve a variator-only mode of operation. A countershaft has a counter gear fixed thereto in mesh with an input shaft gear fixed to the transmission input shaft. The countershaft also has a forward drive gear fixed thereto in mesh with a forward driven gear rotatably disposed on the connecting shaft. A second clutching device selectively rotatively fixes the forward drive gear to the connecting shaft to achieve a power splitting mode of operation. The electronic control unit is operably connected to the variator and is operably connected to the clutching devices. The electronic unit is configured to include logic rules for controlling the transmission. The logic rules include rules by which the clutching devices maintain the transmission in the variator-only mode of operation in a first vehicle speed range and maintain the transmission in the power splitting mode of operation in a second vehicle speed range greater than the first vehicle speed range.

A control system includes an electronic control unit for a dual mode continuously variable transmission for use with a motor vehicle. The transmission includes a transmission shaft, a transmission output shaft, and a variator operably disposed between the transmission input shaft and the transmission output shaft. The variator has a variator input shaft and a variator output shaft. A multi-speed gear unit has an input element and an output element. The multi-speed gear unit incorporates a plurality of gearing elements providing a plurality of forward drive ratios and a plurality of drive ratio clutching elements selectively engaging predetermined members of the gearing elements to provide associated predetermined forward drive ratios. The multi-speed gear unit is operably disposed between the transmission input shaft and the transmission output shaft. A mixer gear set is operably disposed between the transmission output shaft and the variator output shaft and the gear unit output element. A power mode clutching element is operably disposed between the transmission input shaft and the mixer gear set. The power mode clutching element selectively connects and disconnects the input shaft and the mixer gear set to operate the transmission in a power splitting mode of operation and to operate the transmission in a variator-only mode of operation. The electronic control unit is operably connected to the variator and to the gear unit clutching elements and to the power mode clutching element. The electronic control unit is configured to include logic rules for controlling the transmission. The logic rules including rules by which the transmission is put in a variator-only mode of operation in a first vehicle speed range, and maintains the transmission in a power splitting mode of operation in a second vehicle speed range greater than the first vehicle speed range. Once in the power splitting mode, the transmission is shifted between forward drive ratios to enable maintaining constant engine speed while subjecting the variator to only part of the power being used to propel the vehicle in a forward direction.

DETAILED DESCRIPTION

Throughout this specification, references are made to position and orientation. It is to be appreciated by the reader that such references are to facilitate understanding of the invention by the reader, and should not be considered to be limiting to the invention. For example, references to the directions left and right will generally be used in reference to the location of features in a particular figure. References to drive and driven gears will typically refer to the loading of the gears in an engine-driving condition. It should be appreciated that the roles of driving and driven gears may be reversed in an engine over-run condition in which the vehicle is driving the engine, as may be experienced in downhill coasting situation.

First Embodiment

Figure 1:
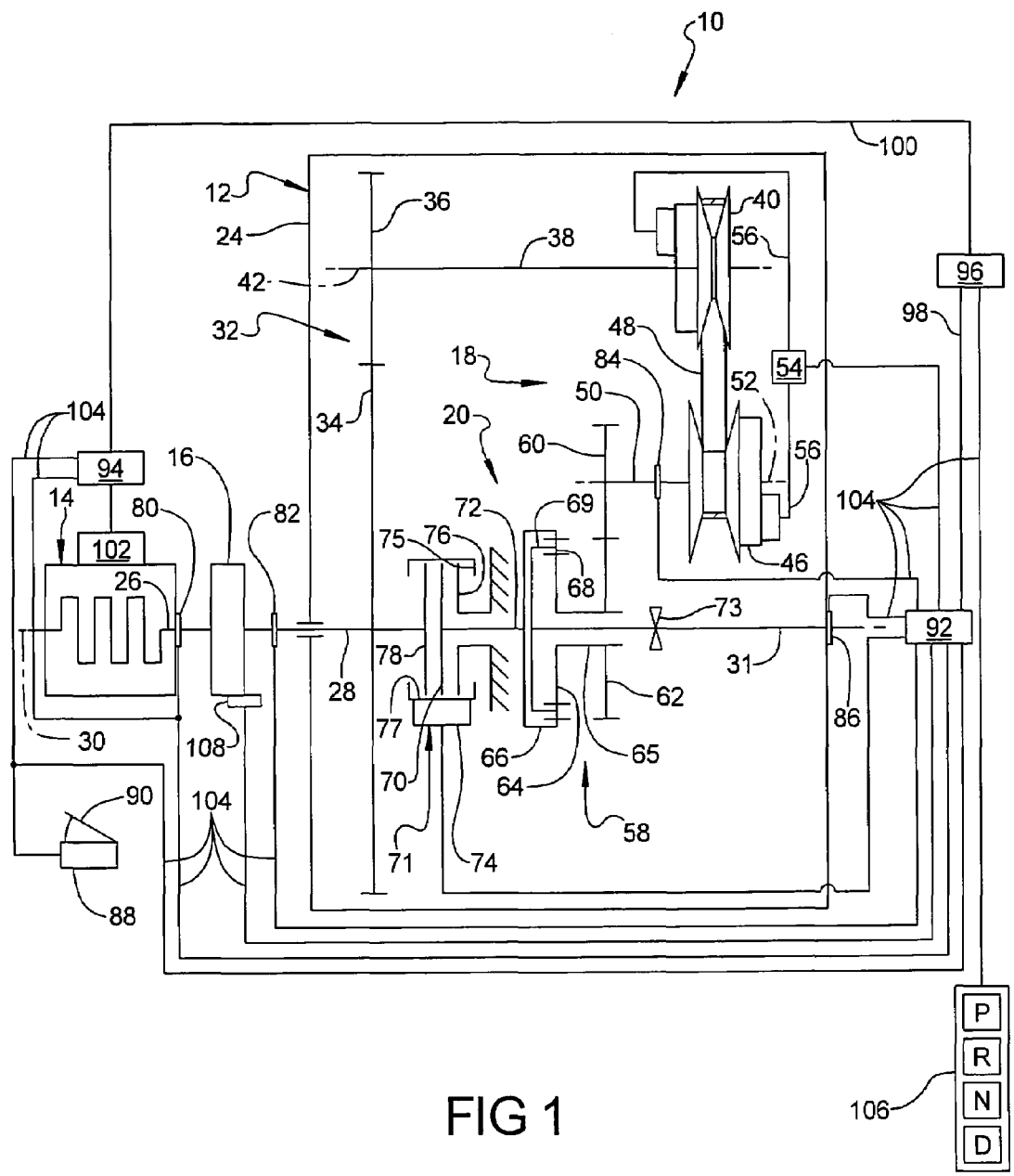
FIG. 1 is a schematic diagram of a first embodiment of a drivetrain system including an engine and a CVT.

Referring to FIG. 1, a vehicle drivetrain 10 including a continuously variable transmission 12 and an electronically controlled internal combustion engine 14 is illustrated. Continuously variable transmission 12 is connected with engine 14 by a normally engaged master friction master clutch 16.

Transmission 12 includes a variator 18 and a planetary mixer gear set 20. Mixer gear set 20 may alternatively characterized as a differential gear set. Variator 18 and planetary mixer gear set 20 are disposed in and supported by a transmission case or housing 24. A somewhat similar system is disclosed in U.S. patent application Ser. No. 10/695,314 filed Oct. 28, 2003 and published on Jul. 1, 2004 as Publication No. US 2004/0127321, which is hereby incorporated by reference into this application.

Engine crankshaft 26 of engine 14 is selectively drivingly connected by master friction clutch 16 to a transmission input shaft 28. Input shaft 28 rotates about a first axis of rotation 30 on which it is centered. A transmission output shaft 31 disposed on axis of rotation 30 extends from a rear of transmission 12 for connection to a drive axle (not shown) or an intermediate drive shaft (not shown).

A variator input fixed ratio element in the form of a gear set 32 drivingly connects input shaft 28 with variator 18. Input gear set 32 includes an input drive gear 34 fixed to input shaft 28, and a variator input driven gear 36 fixed to a variator input shaft 38. Variator input shaft 38 is rotatably fixed to a first variator pulley 40 for unitary rotation therewith. Gear 36, shaft 38 and pulley 40 are centered on and rotate about a second axis of rotation 42 which is parallel to but offset from first axis 30. The diameter of gear 34 is larger than that of gear 36, resulting in a decrease in torque from gear 34 to gear 36 and shaft 38.

First variator pulley 40 is drivingly connected to a second variator pulley 46 by a drive belt or chain 48. Pulley 46 is rotatably fixed to a variator output shaft 50, and rotates about a third axis of rotation 52 parallel to and offset from the first and second axes of rotation 30, 42. Drive chain 48 may be of the type described in any of U.S. Pat. Nos. 5,169,365; 5,201,687; 5,217,412; 5,295,915; 5,538,481; 5,667,448; 5,725,447; 6,017,286; 6,068,565; 6,123,634; 6,129,188; 6,171,207; 6,174,253; 6,186,917; 6,190,274; 6,234,925; 6,270,436; 6,293,887; 6,322,466; 6,336,878; 6,336,880; 6,346,058; 6,358,167; 6,358,181; 6,361,456; 6,361,470 and 6,416,433. Other chain types may be used with equal effect. Pulleys 40 and 46 each have facing conical flanges which can be selectively axially moved toward and away from each other. The radius of engagement between the chain and the pulleys is determined by the distance between the flanges. The closer the flanges are to each other, the larger the effective pulley diameter is. Because the length of chain 48 and the center-to-center distance of pulleys 40 and 46 are fixed, changes in the effective pulley diameter of one pulley must be coordinated with changes in the effective pulley diameter of the other pulley. While pulleys 40 and 46 are shown as being of equal size, they need not be, particularly if it is seen as advantageous to operate principally in either the overdrive mode or the underdrive mode. The displacement of the flanges is controlled by a hydraulic controller 54 communicating pressurized fluid to pulleys through hydraulic connecting channels 56. Pressurized hydraulic fluid from hydraulic controller 54 mechanically displaces the flanges. It should be appreciated that alternative means of displacing the flanges, such as electric motors, may be employed. While only two channels 56 are shown, it may be beneficial to have additional channels 56 for the purpose of more responsively displacing the flanges of the pulleys 40 and 46. It is to be appreciated that the type of variator 18 employed is exemplary only. Alternative types of variators which may be employed include other types of variable diameter belt and pulley variators, pump/motor variators, toroidal type variators, generator/motor variators and all other mechanisms capable of suitably varying torque and speed on a continuous or substantially continuous basis.

The overall ratio range provided by one embodiment of pulleys 40 and 46 is approximately 6:1. In doing so, pulley 40 and 46 provide both an underdrive condition with a torque multiplication factor of about 2.45:1, and an overdrive condition with a torque multiplication of about 1:2.45. In the direct condition, with both pulleys 40 and 46 having the same effective pulley diameter, the torque multiplication factor is 1:1. The underdrive condition is achieved with pulley 40 in a minimum diameter condition in which the flanges of pulley 40 are spread relatively far apart and pulley 46 in a maximum diameter condition in which the flanges of pulley 46 are pushed relatively close together. The overdrive condition is achieved with pulley 40 in a maximum diameter condition in which the flanges of pulley 40 are pushed relatively closed together and pulley 46 in a minimum diameter condition in which the flanges of pulley 46 are spread relatively far apart.

A variator output fixed ratio element in the form of a gear set 58 consisting of an output drive gear 60 and an output driven gear 62 connect variator 18 with planetary mixer gear set 20. Output drive gear 60 is fixed to variator output shaft 50 for unitary rotation therewith. Teeth on output drive gear 60 mesh with teeth on output driven gear 62. Output driven gear 62 is drivingly connected to a sun gear 64 of gear set 20 via a connecting hub 65 to which both gears 62 and 64 are fixed. Hub 65 is coaxial with and circumscribes transmission output shaft 31. Output drive gear 60 is smaller in diameter than output driven gear 62, resulting in an increase in torque from shaft 50 to hub 65.

The functions provided by gear sets 32 and 58 may alternatively be provided by any other fixed ratio mechanism, such as sprocket and chain combinations, belts and pulleys or any other suitable mechanism.

Planetary mixer gear set 20 includes, in addition to sun gear 64, a ring gear 66 and at least two planet gears 68, each meshing with sun gear 64 and ring gear 66. Planet gears 68 are rotatably mounted to a carrier 69 that maintains the planet gears 68 at a fixed distance from one another in the conventional manner. Ring Gear 66 is fixed to a mode clutch hub 70 of a mode clutch mechanism 71 via a connecting shaft 72. Carrier 69 is fixed to transmission output shaft 31 for unitary rotation therewith. Planetary mixer gear set 20 is used to combine torque from variator 18 with torque from input shaft 28 that did not go through variator 18.

A planetary locking clutch 73 in the form of a sliding jaw clutch, provides selective rotative engagement between shaft 31 and hub 65 so that output shaft 31 and hub 65 and mode clutch hub 70, and, therefore carrier 69 and sun gear 64 and ring gear 66, rotate as a unit. It is appreciated that clutch 73 may assume other forms besides a sliding jaw clutch. A transmission controller and an actuating element, not shown, but as described below in the description of the third embodiment, is used to control clutch 73.

Mode clutch mechanism 71 includes a mode control actuator 74 which selectively actuates one of a first brake 75 to rotatively fix hub 70 to a grounded flange 76, or a second brake 77 to rotatively fix hub 70 to an input shaft flange 78. Grounded flange 76 is fixed either directly or indirectly to transmission housing 24. Grounded flange 76 is one form of a grounded element which can take the form of anything fixed to housing 24. The details of actuator 74 as shown are only for purposes of illustration and can take many other forms. What is important is that a mechanism be provided to enable the selective locking of ring gear 66 either to ground, as through ground flange 76, or to input shaft 28. Alternative mechanisms include a jaw clutch arrangement in which the sliding jaw portion of the clutch is mounted to a hub fixed to shaft 72. A toothed hub engageable by the sliding jaw in a first direction of movement would be fixed to input shaft 28. A toothed hub engageable by the sliding jaw in a second direction of movement would be fixed relative to the transmission case. The engaging jaw teeth on the hub can be oriented radially inwardly or radially outwardly with the engaging teeth on the mating parts being oriented in the complementary direction. Yet alternatively, the mechanism could employ a drum element fixed to ring gear 66. The drum element would be selectively engaged to ground through its outer diameter by either a band clutch, or by interleaved clutch plates, with alternate plates splined to the outside diameter of the drum and to an inside diameter of the transmission housing. The drum element would also be selectively engaged to the input shaft by a plurality of interleaved clutch plates, with alternate plates splined to an inside diameter of the drum and to and outside diameter of the input shaft. It should be appreciated that those skilled in the art of transmissions can undoubtedly conceive of yet further alternatives that provide the same function. The precise mechanism by which the desired engagements are achieved is not critical to this invention.

Selective engagement of brakes 75 and 77 and clutch 73 result in different modes of operation. Mode clutch mechanism 71 is key to providing dual modes of operating transmission 12. In a first, or low speed mode, all of the power from engine 14 is directed through variator 18. In a second, or high speed mode, the power from engine 14 is split, with part passing through variator 18, and the rest through connecting shaft 72. The modes of operation are explained in greater detail below, and the roles of brakes 75 and 77 and clutch 73 are laid out in Table 1. It is to be understood that any of clutch mechanism 71, brakes 77 and 75 and clutch 73 may be characterized in whole or in part as clutching elements or clutching devices.

Control and operation of vehicle drivetrain 10 requires the use of a number of sensors, one or more controllers, one or more control units, and electrical connections and links. Sensors include a number of shaft speed sensors, particularly an engine crankshaft speed sensor 80, a transmission input shaft speed sensor 82, a variator output shaft speed sensor 84, a transmission output shaft speed sensor 86, a position sensor 88 for a fuel pedal 90, and a master friction clutch position sensor and various engine and transmission parameter sensors. Control units include transmission electronic control unit (ECU) 92, engine ECU 94 and system ECU 96.

ECUs 92 and 94 communicate with each other and system ECU 96 over multiplexed data buses or links 98 and 100. Bus 98 is disposed between system ECU 96 and transmission ECU 92. Bus 100 is disposed between system ECU 96 and engine ECU 94. ECUs 92, 94 and 96 may be of the type illustrated in U.S. Pat. No. 4,595,986, the disclosure of which is incorporated herein by reference. The ECUs are effective to process the inputs from the sensors cited above in accordance with predetermined logic rules, to issue command output signals to the other ECUs and to transmission controllers 74 and 54 and an engine controller 102 and/or to a display unit and/or to other systems. Engine controller 102 controls, among other parameters, engine fueling. The data buses 98, 100 conform to an appropriate industry standard communications protocol for data links such as SAE J-1922, SAE J-1939, ISO 11898, ISO 11783 or the like.

Information indicative of engine torque, engine speed and transmission output shaft speed will be carried to the ECUs 92 and 94 by conductors 104 disposed between the plurality of sensors and the ECUs. Conductors 104 also communicate command signals to the various system controls and actuators including mode control actuator 74, hydraulic controller 54, engine controller 102 and a master friction clutch actuator 108. Hydraulic controller 54 translates the electronic control signals from ECU 92 transmitted via conductors 104 into pressurized hydraulic fluid passing through hydraulic connecting channels 56. The master friction clutch position sensor is, in the exemplary embodiment, integrated into actuator 108, but may be separate from actuator 108. As controllers 74, 54, 102 and actuator 108 typically comprise portions of closed loop systems, provisions may be made for conductors 104 to handle both for control signals and feedback signals. Alternatively, separate conductors, not shown, may be provided. Further, controllers 74, 54, 102 may also include integral position sensors as may be needed.

A shift selector 106 allows the vehicle driver to select a mode of operation and provides a signal indicative of the selected mode. Possible modes include Park, Reverse, Neutral, and Drive. Shift selector 106 includes a plurality of gear range buttons, which may be selected by the vehicle operator. Shift selector 106 could take other forms not shown, such as a conventional automatic transmission shift lever which moves in a fore-aft direction between positions corresponding to gear ranges. Shift selector 106 connects to system ECU by conductor 104.

Master clutch actuator 108 controls master friction clutch 16 responsive to control signals from transmission ECU 92. Such systems are well known. See U.S. Pat. Nos. 4,081,065 and 4,361,060, the disclosures of which are incorporated herein by reference. Alternatively, master clutch 16 may be a centrifugal clutch of the type disclosed in U.S. Pat. No. 6,502,476 not requiring an actuator, the disclosures of which are incorporated herein by reference. Master clutch 16 need not be disengaged when any of brakes 75 or 77, or planetary locking drive clutch 73 are to be engaged or disengaged. Fuel modulation, as disclosed in U.S. Pat. No. 4,850,236, may be utilized to enable engaging or disengaging any of brakes 75 and 77 and clutch 73 without releasing master clutch 16.

It is to be appreciated that the sensors could alternatively be connected directly to data buses 98, 100 if the output signals of the sensors conform to the selected communications protocol, thereby enabling the signals to the recognized by the ECUs for what they are. Similarly, the system controllers and actuators may be connected directly to data buses 98, 100 if the signals from the ECUs intended for such controllers and actuators are recognizable to such controls and actuators. Certain of the controllers and actuators are described in more detail below. It is further appreciated that wireless systems, such as a Bluetooth® network, could eliminate the need for conductors 106 and buses 98, 100.

Operating Modes

Clutch 73 and brakes 75,77 are used to provide the primary operating modes of transmission 12. Those modes are, as indicated by the markings on shift selector 106, Park, Reverse, Neutral and Drive. Within the Drive mode are a plurality of secondary operating modes which are selectively employed by transmission 12 based on the demands of the vehicle operating conditions. The secondary operating modes include a low speed variator only operating mode, a high speed power splitting operating mode, and a direct mode. Table 1, below, establishes the combination of clutches engagements associated with each of the primary and secondary operating modes, as well as additional potential modes.

TABLE 1

| Condition of | | | Resulting |
| --- | --- | --- | --- |
| Brake 77 | Brake 75 | Clutch 73 | Operating Mode |
| Open | Open | Open | Neutral |
| Open | Locked | Open | Variator Only-Low Speed |
| Locked | Open | Open | Power Splitting |
| Locked | Open | Locked | Possible Direct Mode |
| Open | Open | Locked | Variator Only-High Speed |
| Open | Locked | Locked | Possible Park Mode if Master Clutch is disengaged for idling. |
| Locked | Locked | Locked | Possible Park Mode if Master Clutch is disengaged for idling. |
| Locked | Locked | Open | Possible Park Mode if Variator does not slip, and Master Clutch is disengaged for idling. |

To understand in more detail how the various modes are established, it is helpful to understand the role of the planetary mixer gear set 20.

When ring gear 66 and sun gear 64 are rotating at the same speed, carrier 69 will rotate in unison with gears 66 and 64. When sun gear 64 is rotating slower than ring gear 66, carrier 69 will rotate slower than ring gear 66, but faster than sun gear 64. When sun gear 64 is rotating faster than ring gear 66, carrier 69 will rotate faster than ring gear 66, but slower than sun gear 64. The rotational speed of carrier 69 varies with both the rotational speed of sun gear 64 and the rotational speed of ring gear 66 according to the equation:

$$\Theta_C = (r_R * \Theta_R + r_S * \Theta_S)/(r_R + r_S)$$

where:

$\Theta_C$ is the rotational speed of the carrier 69;

$r_R$ is the radius of ring gear 66;

$\Theta_R$ is the rotational speed of ring gear 66;

$r_S$ is the radius of sun gear 64; and $\Theta_S$ is the rotational speed of sun gear 64.

The Neutral mode is obviously unaffected by the planetary gear set's ratios and is obtained by placing each of brakes 77 and 75 and clutch 73 in the open condition. When transmission 12 is in the Neutral mode, the output shaft 31 can remain stationary, even with master clutch 16 engaged.

As indicated above, the Drive mode incorporates both a low speed operating mode for use in a launch range of speed which may span, for example, from zero to twenty-five miles per hour, and a high speed power splitting mode for use in a cruise range of speed which may span, for example, from fifteen to eighty miles per hour. It is appreciated that there is some overlap between the speed ranges. The low speed operating mode is a variator-only mode in which all of the power is directed through the variator. The low speed operation mode is achieved when brake 75 is engaged, and both brake 77 and clutch 73 are disengaged, consistent with Table 1. With brake 75 engaged, ring gear 66 is fixed to ground, and does not rotate. As a result, planetary mixer gear set 20 acts as a speed reducer, causing carrier to rotate at a speed slower than the unitary sun gear 64, hub 65 and output driven gear 62. Of course, nothing in transmission 12 rotates until master clutch 16 is at least partially engaged, or the vehicle is in motion. With transmission 12 in the low speed operation mode, and variator 18 in the maximum underdrive condition, clutch actuator 108 is used to gradually engage clutch 16. With clutch engagement, the vehicle begins to move. This can be achieved with engine 14 being either allowed to increase in speed from an idle condition, or with engine 14 being held at an optimum operating speed above idle throughout the clutch engagement process. In any case, clutch engagement is gradually completed, and variator 18 adjusted as required to accelerate the vehicle while maintaining the engine at an optimum operating speed. With a continuous operating speed of 1000 revolutions per minute (RPM), and a ring gear to sun gear diameter ratio of 2:1, and an overall variator ratio range of 6:1, the output speed would range from 204 RPM to 1224 RPM with master clutch 16 fully engaged.

At a predetermined vehicle operating point, transmission 12 is shifted from the variator only low speed operating mode to the power splitting high speed operating mode. To achieve the power splitting mode, brake 77 is engaged and both clutch 75 and brake 73 are in the released condition. Using the same exemplary system characteristics as in the example above, the transmission provides an output shaft speed range of between 803 RPM and 1334 RPM. This enables shifting to the power split mode at an output shaft speed of just a little over 800 RPM. The power splitting mode is desirable, as it reduces the amount of power passing through the variator by having some of the power pass directly from shaft 28 to ring gear 66. The reduction in power passing through variator 18 reduces the wear and tear on the variator. Having only part of the power pass through the variator is also beneficial in that the non-variator path is more efficient. The more power that passes through the gear-only path, the less power is lost in the system.

The direct mode in which ring gear 66, carrier 69, and sun gear 64 rotate as a unit potentially offers the benefit of reduced fuel consumption, as variator 18 could be by-passed entirely. To achieve the direct mode, Brake 77 is locked, brake 75 is open and clutch 77 is locked. In such a condition, the ratio of variator 18 is 1:1, assuming that gear sets 32 and 58 have ratios that cancel each other out. Preferably, another clutch or brake, not shown, is used to disconnect variator 18 from the system. For example, such a clutch or brake could be placed in the path of shaft 50 or shaft 38. Yet alternatively, an appropriately located clutch or brake could provide selective engagement and disengagement between either gear 62 and gear 64, or between gear 34 and shaft 28.

A high speed variator-only operating mode can be achieved by leaving both brakes 77 and 75 open, and locking just clutch 73. All of the power goes through the variator and then into sun gear 64. Jaw clutch 73 locks sun gear 64 to carrier 69. With brake 75 open, ring gear 69 is able to rotate as a unit with carrier 69 and sun gear 64. In this condition, given the same system characteristics as in the earlier example, for an engine speed of 1000 RPM, the output shaft speed would range between 408 RPM and 2450 RPM. Given the desire to minimize wear and tear on the variator, such an operating mode is not likely to be used on a regular basis when the power splitting mode is available. It is also unlikely that it would be necessary to provide an overdrive ratio greater than that provided by the power splitting mode.

Several potential options are available for achieving a Park mode of operation. However, as noted in Table 1, master clutch 16 must be disengaged to prevent stalling of the engine in an idle condition. Another potential alternative, not specifically shown in FIG. 1, is to have jaw clutch 73 engage a stationary engaging feature fixed to housing 24 when jaw clutch 73 is moved to the right relative to its location in FIG. 1 to achieve a Park condition. In Park, output shaft 31 would be rotatively fixed to housing 24 by jaw clutch 73. Brakes 77 and 75 would be in the open condition. Yet another alternative would be available if variator 18 could be disconnected from the system as suggested in the description of the direct drive mode. In that case, a Park mode could be achieved by leaving brake 77 open, and locking brake 75 and clutch 73. Since no torque could be passed through variator 18, it would be unnecessary to have master clutch 18 in a disengaged condition to idle engine 14.

While shift selector 106 shows an indicator R for the reverse mode, as well as P for Park, N for Neutral, and D for Drive, no specific provision in the figures is shown for obtaining reverse. However, a reverse idler gear having an axis parallel with axis 30, in combination with a reverse clutching mechanism integrated into locking clutch 73, could provide the desired reverse gear capabilities. In Drive, the transmission would employ the low speed variator-only operating mode, and the higher speed power-splitting mode. Two other potential modes exist which employ clutch 73: a high speed variator-only operating mode, and a direct operating mode. Each of these modes of operation will be discussed in more detail below.

Operation

Transmission 12 operates in the following manner. The driver first selects a desired mode of operation using the shift selector 106. The Drive mode is selected to provide forward motion. The selection is preferably made with the vehicle in a stopped condition. The vehicle is equipped with a brake pedal (not shown) as well as fuel pedal 90. The brake pedal, when depressed, actuates the vehicle brakes which serve to bring the vehicle to a stop or to maintain the vehicle in a stopped condition. In the stopped condition, the vehicle operator may have his foot resting on the brake. Master friction clutch 16 is in a disengaged condition. To initiate vehicle movement, the vehicle operator moves his right foot to fuel pedal 90 and depresses it. The transmission 12 is initially in the low speed mode. Based on input signals from sensors 82, 84, 86 and 90 and from system controller 96, variator 18 is directed by controller 54 to a maximum underdrive condition. ECU 92 commands the engagement of master friction clutch 16 via actuator 108 using feedback from the integral sensor therein.

Torque from engine 14 is transferred through clutch 16 to input shaft 28. With brake 77 released, all torque from input shaft 28 is transferred to input gear set 32. The torque and speed of from shaft 28 are respectively reduced and increased in shaft 38 by the ratio of gear set 32. Variator 18 transforms the torque and speed from shaft 38 to a selected torque and speed which is output through shaft 50. Gear set 58 increases the torque and decreases the speed transferred from shaft 50 to hub 65. Reducing the torque to variator 18 with first gear set 32, and then stepping up the torque from the variator with second gear set 58, beneficially allows the use of a reduced torque capacity variator then would otherwise be required. The trade-off is that the variator will operate at higher speeds than it otherwise would. In the maximum underdrive condition, pulley 40 has its flanges at a maximum distance from each other to provide a minimum effective pulley diameter, and pulley 46 has its flanges at a minimum distance from each other to provide a maximum effective pulley diameter. As chain 48 is of essentially a fixed length, the larger the diameter of pulley 40 relative to the diameter of pulley 46, the slower pulley 46 rotates relative to pulley 40, and the greater the torque of pulley 46 is compared to the torque of pulley 40. Torque from hub 65 is transferred to sun gear 64, which is in turn transferred to carrier 69 through planet gears 68. It is the torque of carrier 69 which is communicated to output shaft 31.

With the initiation of engagement of clutch 16, the vehicle begins to move. Clutch engagement can be achieved with engine 14 being either allowed to increase in speed from an idle condition, as would almost certainly be the case if a centrifugal clutch were being employed, or with engine 14 being held at an optimum operating speed above idle throughout the clutch engagement process. In any case, clutch engagement is gradually completed, and variator 18 responsive to commands from ECU 92 via controller 54 as required to accelerate the vehicle while maintaining the engine at an optimum operating speed. As variator 18 adjusts from a maximum underdrive or torque multiplication condition toward a maximum speed multiplication condition, the flanges of pulleys 40 and 46 shift their relative orientation. The flanges of pulley 40 begin moving toward each other while the flanges of pulley 46 begin moving away from each other. In a system having the ratio characteristics given above, this shifting of pulley diameters continues until the speed of output shaft 31 is approximately equal to and preferably slightly greater than the expected output speed of output shaft in the power splitting mode at the desired or target engine speed. At that point, mode clutch mechanism 71 is signaled by transmission controller 92, in accord with software embedded in controller 92, to shift transmission 12 to the power splitting mode, disengaging brake 75 and engaging brake 77. Variator 18 is simultaneously be moved back toward the maximum underdrive condition. Depending on the mechanisms chosen for brakes 77 and 75, the shift from the low speed variator-only mode to the powersplitting mode can be made as a power shift with no significant interruption of torque to the transmission output shaft.

As in the low speed variator-only mode, torque from engine 14 is transferred through clutch 16 to input shaft 28. However, that torque is now split into two components, with a first part being transferred to ring gear 60 and a second part to variator 52 via gear set 62. The sum of the torque transmitted by drive gear 64 and ring gear 60 equals the torque transmitted by clutch 16. The torque from gear 64 is further reduced by the ratio of gear set 62 before reaching variator 52. Reducing the torque to the variator 52 by first splitting it with the planetary gear set 54, and further stepping down torque with gear set 62, and then stepping up the torque from the variator with second gear set 82, beneficially allows the use of a relatively low torque capacity variator to enable operation of a vehicle across a wide range of road speeds at a constant engine speed. The variator, in an underdrive condition, multiplies the torque. Torque from the variator 52 is again increased by the ratio of gear set 82, and transferred to sun gear 88. The combined torque of sun gear 88 and ring gear 60 is transferred to carrier 94 through planet gears 92. It is the torque of carrier 94 which is communicated to input shaft 98. Gear unit 20 multiples the torque by the ratio of the selected gear to generate the final output torque at output shaft 100.

Direct drive can be achieved when the speed of output shaft 31 is equal to that of input shaft 28. To do this, brakes 77 and 75 are left undisturbed, that is respectively locked and open, and clutch 73 is engaged. When the input shaft 28 and the output shaft 31 are at the same speed, then sun gear 64 will also be rotating at the same speed as the output shaft, enabling clutch 73 to lock. As indicated earlier, control during operation in the direct mode will be simplified if variator 18 can be disconnected from the system.

It is thus apparent that with a single shift, a ratio spread of, in the exemplary embodiment, nearly 7:1 can be achieved while the variator experiences only a fraction of the total engine torque.

Second Embodiment

Figure 2:
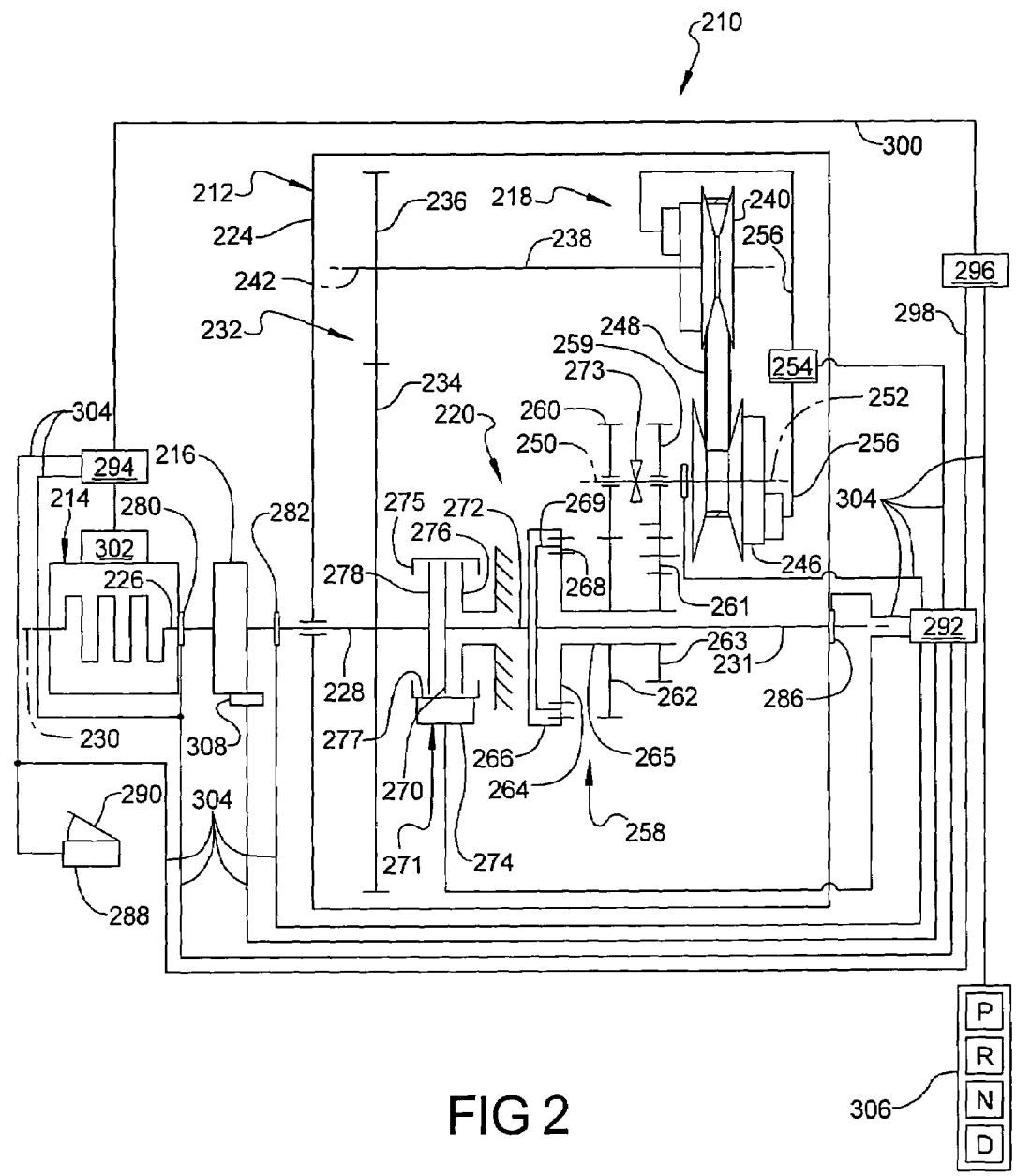
FIG. 2 is a schematic diagram of a second embodiment of a drivetrain system including an engine and a CVT.

FIG. 2 shows a second embodiment of the invention. Except as indicated otherwise, the elements of the second embodiment are common with those of the first embodiment. All reference numerals in FIG. 2 correspond to elements having the same names as the elements in FIG. 1, except that the reference numerals in FIG. 2 are greater by 200, unless otherwise indicated. The embodiment of FIG. 2 is similar to the embodiment of FIG. 1 except that no jaw clutch is provided on output shaft 231 to fix sun gear 264 to output shaft 231. Instead, a jaw clutch 273 is provided on the variator output shaft 250. Jaw clutch 273 selectively engages one of a reverse output drive gear 259 and a forward output drive gear 260. A transmission controller and an actuating element, not shown, but as described below in the description of the third embodiment, is used to control clutch 273. A reverse idler gear 261, rotatable about an axis parallel to axis 230, is provided between reverse output drive gear 259 and a reverse output driven gear 263. Both the forward output driven gear and reverse output driven gear 262 and 263 are fixed to the same connecting hub 265. Table 2, below, shows the operating modes achieved as a function of the condition of brakes 277, 275 and clutch 273.

TABLE 2

| Condition of | | | Resulting |
| --- | --- | --- | --- |
| Brake 277 | Brake 275 | Clutch 273 | Operating Mode |
| Open | Open | Any | Neutral |
| Open | Locked | Forward | Variator Only-Low Speed Forward |
| Locked | Open | Forward | Power Splitting - Forward |
| Open | Locked | Reverse | Variator Only - Reverse |
| Locked | Open | Reverse | Power Splitting - IVT |

The Neutral mode is established by having brakes 277 and 275 in the open condition. Clutch 273 can be in any condition. Even with master clutch 216 engaged, transmission 212 transmits no torque to output shaft 231.

As in the first embodiment, the Drive mode incorporates both a low speed operating mode and a high-speed power splitting mode. The low-speed operating mode is a variator-only mode in which all of the power is directed through the variator 218. The low speed mode is achieved when brake 275 is engaged, brake 277 is disengaged and clutch 273 is in the forward position, drivingly connecting gear 260 with shaft 250. Transmission 218 achieves the power splitting operating mode by locking or engaging brake 277, releasing brake 275, and having clutch 273 in the forward, or in FIG. 2 the leftmost position, drivingly connecting gear 260 with shaft 250.

Provision for achieving Reverse is specifically provided for in the present embodiment. Drive in the Variator Only-Reverse mode is achieved by fixing gear 259 to shaft 250 with clutch 273. Sun gear 264 is driven in the reverse direction. With ring gear 266 fixed by brake 275, carrier 269, and hence output shaft 231, rotates in the reverse drive direction.

Vehicle drive in the reverse direction can be achieved in both the Reverse mode and in the Power Splitting-IVT mode. The lowest speeds in both forward and reverse will be achieved in the Power splitting—IVT mode. By having brake 277 locked, brake 275 unlocked or open, and clutch 273 in the reverse condition, transmission 212 is placed in the reverse power splitting mode which results in an Infinitely Variable Transmission (IVT). An IVT is distinguished from a CVT in that a CVT enables continuous variation of the transmission ratio between two values less than infinity, while an IVT enables the transmission to achieve a transmission torque multiplication ratio of infinity in which the output shaft has a speed of zero independent of the engine speed. In the Power Splitting-IVT mode, ring gear 266 rotates in a forward drive direction, and sun gear 264 is rotated in the reverse drive direction. When sun gear 264 is rotating at a speed equal to the speed of the ring gear 266 times the ratio of the ring gear diameter to the sun gear diameter, the resultant rotational speed of carrier 269 will be zero. If sun gear 264 rotates faster, then the vehicle is driven in reverse. If sun gear 264 rotates slower, then the vehicle is driven forward. By keeping the resultant carrier speed low, transmission 212 can be used to drive the vehicle at very low speeds in either the forward or reverse direction. It is expected that ECU 292 would prohibit operation in the IVT mode at or near infinite torque.

Operation of transmission 212 is much like that of transmission 12 except for the addition of forward and reverse ultra low-speed or creep modes described above. Depending on the application of transmission, the Variator-Only Reverse mode may or may not be employed. If there is a need for a relatively high speed reverse operation of the vehicle, as there sometimes is for certain vocational products such as dump trucks, then multiple reverse modes providing a wide spectrum of reverse vehicle speeds could be advantageously accommodated.

Third Embodiment

Figure 3:
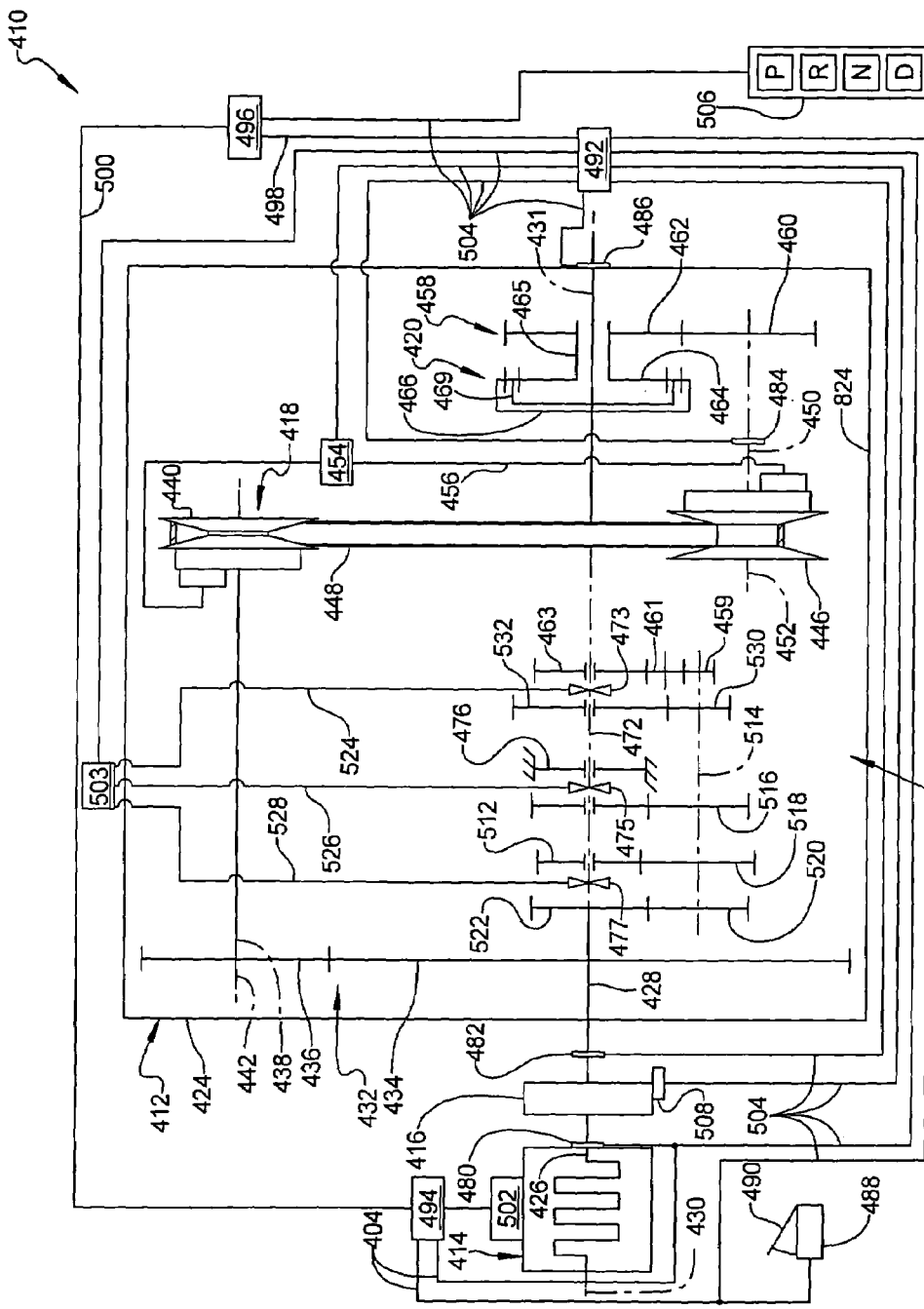
FIG. 3 is a schematic diagram of a third embodiment of a drivetrain system including an engine and a CVT.

FIG. 3 shows a third embodiment of the invention. Except as indicated otherwise, the elements of the third embodiment are common with those of the first embodiment. All reference numerals in FIG. 3 correspond to elements having the same names as the elements in FIG. 1, except that the reference numerals in FIG. 3 are greater by 400, unless otherwise indicated. A CVT 412 incorporates a countershaft gear unit 422 in combination with a variator 418 and a planetary mixer gear set 420 like that found in FIG. 1. Gear unit 422 and the features used to control it are found in automated mechanical transmissions sold by Eaton Corporation, the assignee of this invention, under the name AutoShift®. Gear unit 422 is similar to the transmissions shown in U.S. Pat. Nos. 3,105,395, 3,283,613 and 4,754,655, the disclosures of which are hereby incorporated by reference. A benefit of incorporating gear unit 422 into CVT 412 is that it provides CVT 412 with a much broader torque ratio range than a CVT without such a gear unit. The embodiment of FIG. 3 lacks a clutch corresponding to clutch 73 to lock output shaft 431 to sun gear 464. Countershaft gear unit 422 provides three three-position jaw clutches 473, 475 and 477 which selectively connect shaft 472 with one of three forward driven gears for ratios 1 through 3, with input shaft 428 for direct drive, with grounded hub 476, and with reverse driven gear 463. The three positions include, consistent with the orientation of the clutches in the drawings, a leftward engaged position, a rightward engaged position, and a neutral or disengaged position midway between the engaged positions. The clutches may be either synchronized or non-synchronized type sliding jaw clutches. Engaging sleeves of the jaw clutches are slidable along axis 430 for selective engagement with the desired gear element.

First-reverse clutch 473 selectively engages one of a reverse driven gear 463 and a first forward driven gear 532. A reverse idler gear 461 is provided between reverse driven gear 463 and a reverse drive gear 459. Jaw clutch 475 selectively engages one of a grounding hub fixed to housing 424 and a second forward driven gear 510. Jaw clutch 477 selectively engages one of a fourth forward driven gear 512 and input shaft 428. A countershaft 514 has first, second and fourth forward drive gears 530, 516, and 518 respectively, as well as counter gear 520 fixed thereto. Counter gear 520 is in mesh with an input shaft gear 522. Input shaft gear 522 is fixed to input shaft 428. Similarly, first, second and fourth drive gears 530, 516, and 518 are in mesh with first, second and fourth driven gears 532, 510 and 512. Table 3, below, shows the operating modes achieved as a function of the condition of clutches 477, 475 and 473. As with the embodiment of FIG. 2, it is possible to achieve, through the appropriate selection of clutches 473, 475, and 477 conversion of CVT 412 to an IVT. The gears and shafts and clutches described in this paragraph may be characterized as a gear unit.

A shift controller 503 is used to displace the engaging sleeves to achieve the desired gearing condition. Shift controller 503 is connected with ECU 492 and receives command signals therefrom. Controller 503 may also have integrated therein position sensors or other sensing elements which provide feedback to ECU 492. Controller 503, responsive to commands from ECU 492, displaces shift linkage elements, such as shift forks, which are disposed within transmission housing 424 in a manner common to both manual transmissions and automated mechanical transmissions. The X-Y shift actuator connects to a shift linkage within transmission 412. The shift linkage in one embodiment includes individual actuating elements 524, 526 and 528, such as shift forks, engaging each of the sleeves of clutches 473, 475 and 477 respectively, consistent with conventional mechanical transmission structures. Shift forks are slidably disposed on shift rails for axial movement to provide the desired axial movement of the sleeves.

One well known controller is an X-Y shift actuator, which by way of example may be of the types illustrated in U.S. Pat. Nos. 5,481,170; 5,281,902; 4,899,609; and 4,821,590. This type of actuator is well suited for automated or shift-by-wire shifting of the transmission main section and/or auxiliary section. The actuator has a pair of electrically operated motors or servos, one for inducing movement of a shifting element in, from the perspective of a driver, the lateral direction to select a particular clutch, and one for inducing movement of the shifting element in a fore-aft direction to engage the selected clutch with a selected gear or other engaging element. Shift selector 506 as shown has a plurality of buttons for selecting the mode of operation of the transmission. Each button bears a symbol indicative of the associated mode of operation. Shift selector 506 could alternatively take other forms not illustrated, such as a shift lever having a shift knob. The lever could be toggled between positions corresponding to gear ranges.

Engine controller 502 and transmission controller 503 receive instructions from engine electronic control unit (ECU) 494, transmission ECU 492 and system ECU 496. Engine ECU 494 and system ECU 496 communicate with each other over a first multiplexed data bus 500 employing an appropriate communications protocol such as SAE J-1922, SAE J-1939, ISO 11898 or the like. Transmission ECU 492 and system ECU 496 similarly communicate with each other over a second multiplexed data bus 498. It should be appreciated that the invention would operate equally well if one or more of ECUs 492, 494, 496 were combined.

In a preferred embodiment, countershaft 514 is one of two identical countershafts. As is well known, the use of dual countershafts reduces the diameter of the gears, and ultimately the amount of space needed by a transmission, to sustain a given torque load.

The arrangement of FIG. 3 is superior to the arrangement of earlier referenced U.S. patent application Ser. No. 10/695,314 in that power passes through the countershaft in a power splitting mode. That is, not all of the power from engine 414 passes through transmission 412. In the arrangement of U.S. patent application Ser. No. 10/695,314, all of the power passes through the gear unit. The present arrangement thus allows the use of a lower torque capacity, and thus a smaller, more compact transmission than that required for use in the arrangement of U.S. patent application Ser. No. 10/695,314 for a given application. Table 3, below, shows the operating modes achieved as a function of the condition of clutches 477, 475 and 473.

TABLE 3

| Condition of | | | Resulting |
| --- | --- | --- | --- |
| Brake 477 | Brake 475 | Clutch 473 | Operating Mode |
| Neutral | Neutral | Neutral | Neutral |
| Neutral | Ground | Neutral | Variator Only - Low Speed Forward |
| Neutral | Neutral | First | Power Splitting - Forward, First |
| Neutral | Second | Neutral | Power Splitting - Forward, Second |
| Input Shaft | Neutral | Neutral | Power Splitting - Forward, Direct |
| Overdrive | Neutral | Neutral | Power Splitting - Forward, OD |
| Neutral | Neutral | Reverse | Power Splitting - IVT |

Neutral mode is achieved by having each of clutches 477, 475 and 473 in an open or neutral condition.

In a start-from-stop condition, ECU 492 commands transmission 412 to the Variator Only—Low Speed Forward mode via controllers 454 and 503, and initiates engagement of clutch 416 responsive to operator displacement of fuel pedal 490. Actuating element 526 is used by controller 503 to engage clutch 475 with grounded hub 476. Clutches 473 and 477 are both in the disengaged or neutral condition. With this combination of engaged and released clutches, power bypasses gear unit 422, and passes entirely through variator 418. More specifically, torque and power from engine 414 passes through clutch 416, to input shaft 428, through gear set 432, through variator 418, through gear set 458, through planetary mixer gear set 420, and out through output shaft 431. With clutch 475 engaging grounded hub 476, ring gear 466 is fixed relative to the housing, causing planetary gear set 420 to act as a speed reducer, resulting in carrier 469 and output shaft 431 rotating at a slower speed than sun gear 464. This corresponds to the Variator Only—Low Speed mode of operation in the embodiment of FIG. 1 and Table 1.

Clutch actuator 508 controls master clutch 416 responsive to control signals from transmission ECU 492. Such systems are well known. See U.S. Pat. Nos. 4,081,065 and 4,361,060, the disclosures of which are incorporated herein by reference. Alternatively, master clutch 416 may be a centrifugal clutch of the type disclosed in U.S. Pat. No. 6,502,476 not requiring an actuator, the disclosures of which are incorporated herein by reference. Master clutch 416 need not be disengaged for each shift. Fuel modulation, as disclosed in U.S. Pat. No. 4,850,236, may be utilized for shifting gear unit 412 without releasing the master clutch 416.

Once vehicle motion has been initiated, variator 418 changes its ratio from underdrive toward overdrive to increase the speed of the vehicle. At a predetermined vehicle parameter, such as vehicle speed, but alternative engine speed or some combination of parameters such as engine speed and throttle position, transmission shifts from the Variator Only—Low Speed Forward mode to Power Splitting—Forward, First mode. The shift can be made by either disengaging master clutch 416, or by leaving it engaged and executing a clutchless or closed clutch or float shift. The use of clutchless shifting in automated mechanical transmissions is well known in the art. Alternatively, master clutch 16 can be disengaged to permit an open clutch shift. Generally, clutchless shifting is employed with greater benefit with non-synchronized jaw clutches, and open clutch shifting is employed with greater benefit with synchronized jaw clutches. However, it should be appreciated that with adequate control of the engine and transmission, both open and closed clutch shifting may be employed with either synchronized or non-synchronized jaw clutches. Whether done in open clutch or closed clutch fashion, gear unit 422 is shifted to the Power Splitting—Forward, First mode by controller 503. Controller 503 causes clutch 475 to be moved to the neutral position, and clutch 473 to engage first gear 461.

In this mode of operation, part of the torque continues to follow the same path as that described above for the Variator Only—Low Speed Forward mode of operation. But with first driven gear 463 engaged by clutch 473, and ring gear 466 free to rotate, part of the power now passes through gear unit 422. While part of the power and torque from engine 414 continues to pass through variator 418 via gear set 432, part of it also passes from input shaft 428 through input shaft gear 522 to counter gear 520, down countershafts 514 (only one of which is shown), to first forward drive gear 530, to first forward driven gear 532, through clutch 473 to shaft 472 and to ring gear 466. The torque and power transmitted to both ring gear 466 and sun gear 464 is transferred via planet gears 468 to carrier 469 and output shaft 431.

As the vehicle increases in speed, controller 503 is commanded to shift to second with the power flow path remaining the same, except that instead of the power being transferred from shaft 514 to shaft 472 via the first drive and driven gears 530 and 532, it is transferred via second drive and driven gears 516 and 510. In direct, or what some might call third gear, power bypasses counter shafts 514, going directly from input shaft 428 to shaft 472 via the engagement of gear 522 and shaft 428 by clutch 477. This mode of operation is analogous to the power splitting mode of the embodiment of FIG. 1 and Table 1. With a yet further increase in vehicle speed, controller 503 is commanded to shift to overdrive, or fourth gear. The power flow is the same as for first and second, but with power being transferred from shaft 514 to shaft 472 via drive and driven gears 518 and 512.

The IVT mode is achieved by placing clutches 475 and 477 in the neutral condition, and clutch 473 in engagement with reverse gear 463. This is preferably done with the vehicle in a stopped condition. The IVT mode in this third embodiment differs from the IVT in the embodiment of FIG. 2 and Table 2 in that in this embodiment of FIG. 3, it is ring gear 466 which rotates in the reverse direction, while in FIG. 2 it is the sun gear which rotates in the reverse direction.

As with the second embodiment, when sun gear 464 is rotating at a speed equal to the speed of the ring gear 466 multiplied by the ratio of the ring gear diameter to the sun gear diameter, the resultant rotational speed of carrier 469 will be zero. Opposite the result in the second embodiment, if sun gear 464 rotates faster than the above specified equilibrium speed, then the vehicle is driven forward. If sun gear 464 rotates slower, then the vehicle is driven in reverse. By keeping the resultant carrier speed low, transmission 412 can be used to drive the vehicle at very low speeds in either the forward or reverse direction.

The torque multiplication of the IVT mode is limited by ECU 492. Limiting the torque keeps the output shaft speed away from the zero speed condition. Accordingly, when operating in the IVT mode, transmission 412, and particularly controller 454, must receive instructions on whether the vehicle motion desired is forwards or backwards. In either case, the operating ratio of variator 418 must be established to provide the desired result. In the IVT mode, total transmission torque multiplication is preferably limited to a ratio of 17:1 in both a reverse and a forward direction.

All reverse drive operation provided by transmission 412 is in the IVT mode. The transmission controller could default to the most extreme reverse underdrive ratio permitted—a reverse creep condition—as a default start condition, and through the variator change the ratio as less torque is needed. As an alternative, another button (not shown) could be placed on selector 506 providing the specific election of a Low Reverse ratio distinct from and in addition to a button for a more conventional Reverse ratio. Controller 492 would have specific variator ratios which it would associate with each of Low Reverse and Reverse to achieve the desired reverse ratios.

As the IVT mode may be used to provide a forward creep mode, it is would be useful to the operator to have a Low mode indicator in the form of an L on selector 506 to facilitate selection of the forward creep mode. Alternatively, it is possible to achieve a forward creep mode without affirmative selection by the operator through the use of automation in combination with control logic which would automatically assess whether or not the creep mode is an appropriate one for the circumstances.

An advantage of this configuration is that a lower torque gear unit can be used. Also, it is believed that since in the anticipated applications relatively little time will be spent in the variator only mode, the anticipated duty cycle is such that there will ultimately less damage done to the variator by using it at low speeds even though it may see more torque in that range.

The advantages of the embodiment of FIG. 3 and Table 3 can be better understood by applying some exemplary values to the various ratios.

TABLE 4

| Description | Ratio |
| --- | --- |
| variator ratio spread | 2.4:1 to .4:1 |
| ratio planetary mixer | 4.265:1 ($r_R/r_S$ = 3.265) |
| Variator Input (Step-up) gear set (432) | .3:1 |
| Variator Output (Step-down) gear set (458) | 4:1 |
| $1^{st}$ gear ratio | 3.256:1 |
| $2^{nd}$ gear ratio | 1.55:1 |
| $3^{rd}$ (direct) ratio | 1.00:1 |
| $4^{th}$ (OD) ratio | .74:1 |
| Reverse Ratio | 2.8:1 |

Overall (cumulative) ration of input shaft speed to output shaft speed in the forward start ratio (variator only) mode in the maximum underdrive condition is 12.3:1. The highest ratio available in the IVT mode, both forward and reverse, is 17:1. The specified $1^{st}$ through $4^{th}$ gear ratios reflects the gear ratio of gears 520 and 522 as well as the gear sets for each of the selected gears, and therefore reflects the ratio of input shaft 428 speed to connecting shaft 472 speed.

Figure 4:
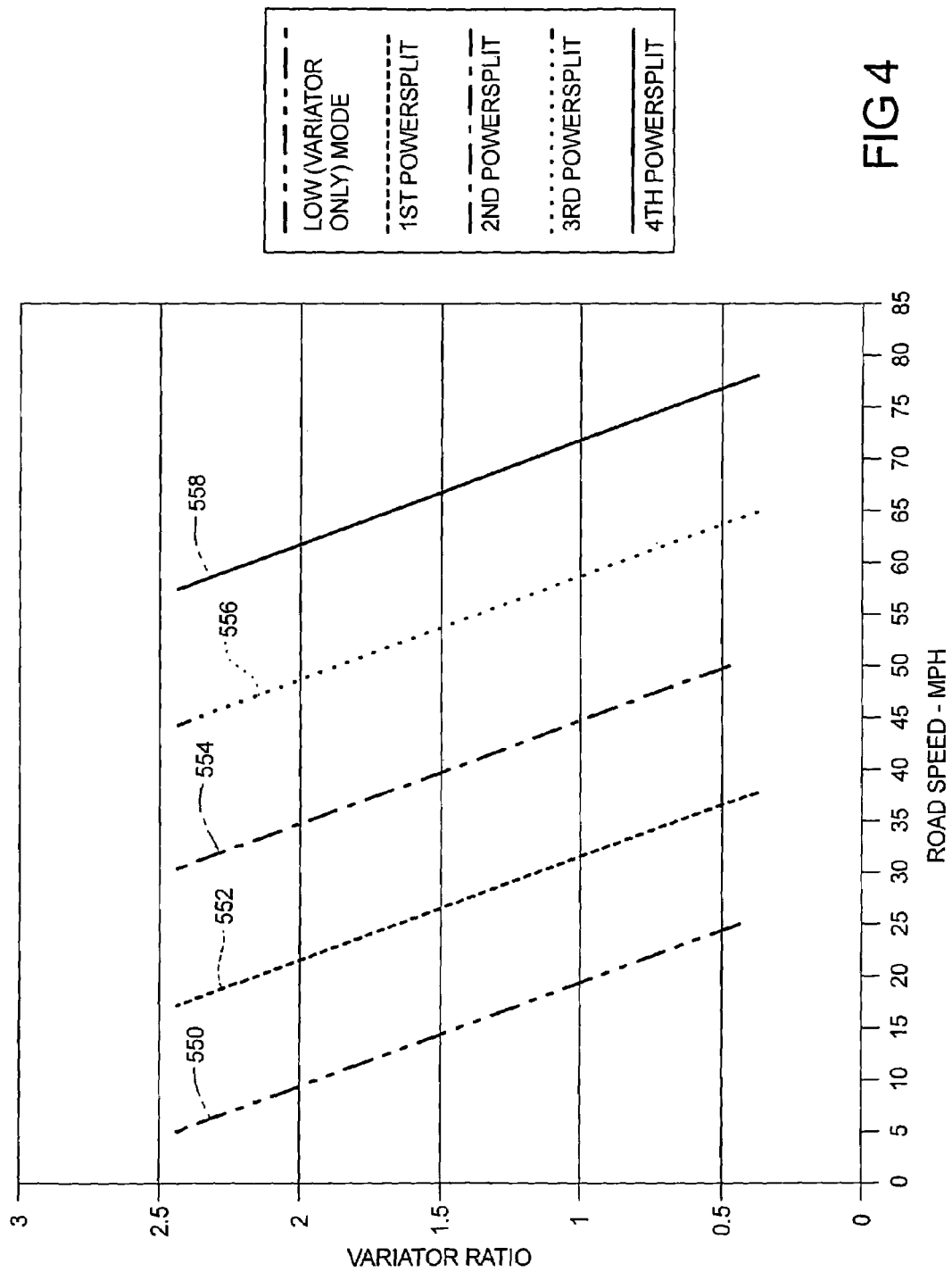
FIG. 4 is a plot of road speed as a function of variator ratio for the forward drive ratios of the embodiment of FIG. 3.

The graph of FIG. 4 plots road speed as a function of variator ratio, showing one line 550, 552, 554, 556 and 558 for each of the forward drive modes Variator Only—Low Speed Forward; Power Splitting—Forward, First; Power Splitting—Forward, Second; Power Splitting—Forward, Direct; and Power Splitting—Forward, OD respectively and employing the ratios of Table 4. FIG. 4 shows a significant amount of overlap of vehicle speeds between the adjacent gear ranges. The overlap is achieved by employing gears on the countershaft 514 and connecting shaft 472 which provide fairly uniform speed steps narrower than the speed range in a single gear provided by the variator 418. The exemplary embodiment shows an overlap of approximately fifty percent of the range provided by the variator. This overlap beneficially provides a great deal of flexibility on where one may make a shift between gears to maintain a substantially constant engine speed. The resultant flexibility enables decisions on shift points to be made to optimize fuel economy and to minimize the need for shifts at all.

Fourth Embodiment

Figure 5:
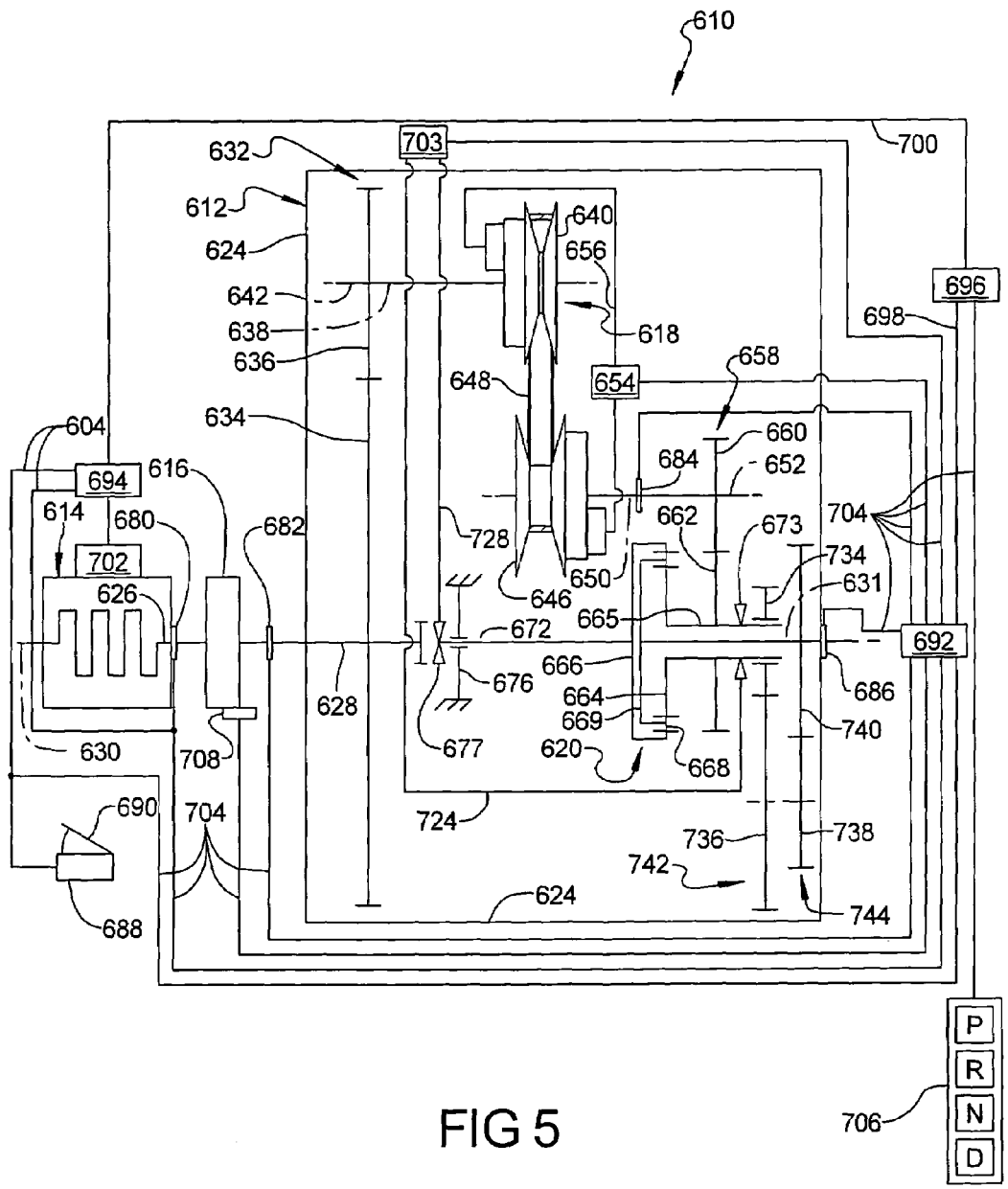
FIG. 5 is a schematic diagram of a fourth embodiment of a drivetrain system including an engine and a CVT.

FIG. 5 shows a fourth embodiment of the invention. Except as indicated otherwise, the elements of the fourth embodiment are common with those of the first embodiment. All reference numerals in FIG. 5 correspond to elements having the same names as the elements in FIG. 1, except that the reference numerals in FIG. 5 are greater by 600, unless otherwise indicated. A three-position jaw clutch 677 replaces mode clutch mechanism 71, including brakes 77 and 75. Jaw clutch 677 selective rotatively locks connecting shaft 672 with one of input shaft 628 and grounded hub 676. Jaw Clutch 677 can of course be placed in the neutral condition where it engages neither. Jaw clutch 673 has two positions: engaged, in which it drivingly connects connecting hub 665 with output shaft 631 via first and second stage gear sets 742 and 744, and disengaged in which gear 734 is able to freewheel on connecting hub 665.

Gear 734 is the drive gear of the first stage gear set 742. Gear 734 meshes with first stage driven gear 736. Second stage drive gear 738 is fixed to a common counter shaft and rotates as a unit with first stage driven gear 736 about an axis parallel to axis 630. Second stage drive gear 738 meshes with second stage driven gear 740. Second stage driven gear 740 is fixed to and rotates as a unit with output shaft 631. Both first stage gear set 742 and second stage gear set 744 increase torque transmitted to shaft 631. Together, gear sets 744 and 742 provide more torque multiplication than is possible within the practical limits of a single gear set. Gear sets 742 and 744 in combination provide a very deep gear reduction to enable creeping operation at low vehicle speeds. Table 5, below, shows the operating modes achieved as a function of the condition of clutches 677 and 673.

TABLE 5

| Condition of | | Resulting |
| --- | --- | --- |
| Brake 677 | Brake 673 | Operating Mode |
| Neutral | Disengaged | Neutral |
| Neutral | Engaged | Variator Only - Very Low Speed Forward |
| Grounded Hub engaged | Disengaged | Variator Only - Low Speed Forward |
| Input Shaft | Disengaged | Power Splitting - High Speed Forward |

The Neutral mode is established by placing clutch 677 in the neutral position, and clutch 673 in the disengaged position. Having clutch 677 in the neutral position prevents the transmission of any torque from shaft 628 to ring gear 666. With clutch 673 in the disengaged position, variator 618 is unable to transfer any torque. The inertia of the vehicle will resist and input from sun gear 664, but ring gear 666 will not. The rotation of sun gear 664 will be transferred to planet gears 668, and then to ring gear 666 which will freewheel. The Drive mode incorporates three separate submodes as laid out in Table 5. The first of these is Variator Only-Very Low Speed Forward mode. In that mode, clutch 677 is left in the Neutral position, and clutch 673 is engaged with gear 734. With clutch 677 in the Neutral position, all of the power passes through the variator. Ring gear is able to freewheel. All of the power out of variator is then transferred via gear set 658 to connecting hub 665, and then through clutch 673 to gear 734. Gear 734 is the drive gear of the first stage gear set 742. Gear 734 meshes with first stage driven gear 736. Second stage drive gear 738 is fixed to a common counter shaft and rotates as a unit with first stage driven gear about an axis parallel to axis 630. Second stage drive gear 738 meshes with second stage driven gear 740. Second stage driven gear 740 is fixed to and rotates as a unit with output shaft 631. Both first stage gear set 742 and second stage gear set 744 increase torque. Together, gear sets provide more torque multiplication than is possible within the practical limits of a single gear set. Gear sets 742 and 744 in combination provide a very deep gear reduction to enable creeping operation at low vehicle speeds.

The Variator Only—Low Speed Forward mode is achieved with clutch 677 engaging grounded hub 677 and clutch 673 in the disengaged condition. With clutch 677 and therefore ring gear 666 fixed to ground, ring gear 666 becomes a reaction member, and all of the power still passes entirely through variator 618. With clutch 673 open, and ring gear 666 fixed to ground, power from variator 618 is transferred entirely to shaft 631 via carrier 664. With ring gear 666 fixed, planetary mixer gear set 620 serves as a speed reducer as in the Variator Only—Low Speed mode of the first embodiment.

The Power Splitting—High Speed Forward mode is achieved with clutch 677 engaging input shaft 628, and clutch 673 in the disengaged condition. With clutch 677 locking input shaft 628 to shaft 672, transmission 612 operates in a power splitting mode, with part of the power from engine 614 going through shaft 672 to ring gear 666 and part through variator 618 to sun gear 664. Planetary mixer gear set 620 combines the torque and transfers it to output shaft 631 in the same manner as in the Power Splitting mode of the first embodiment.

The fourth embodiment of the invention operates in essentially the same manner as the first embodiment of the invention, except that a controller 703 is used to control jaw clutch 677 as well as jaw clutch 673 via actuating elements 728 and 724 respectively. With the use of jaw clutches 677 and 673, it is not possible to power shift. Controller 703 is connected to ECU 692 and is responsive to commands therefrom. Transmission 612 starts off from a stop in the Variator Only-Low Speed Forward mode. With sufficient speed, or perhaps a determination that less than maximum torque is needed to launch the vehicle, Transmission 612 shifts to Variator Only—Medium Speed Forward mode. Finally, transmission 612 shifts to the Power Splitting—High Speed Forward mode for cruising.

Fifth Embodiment

Figure 6:
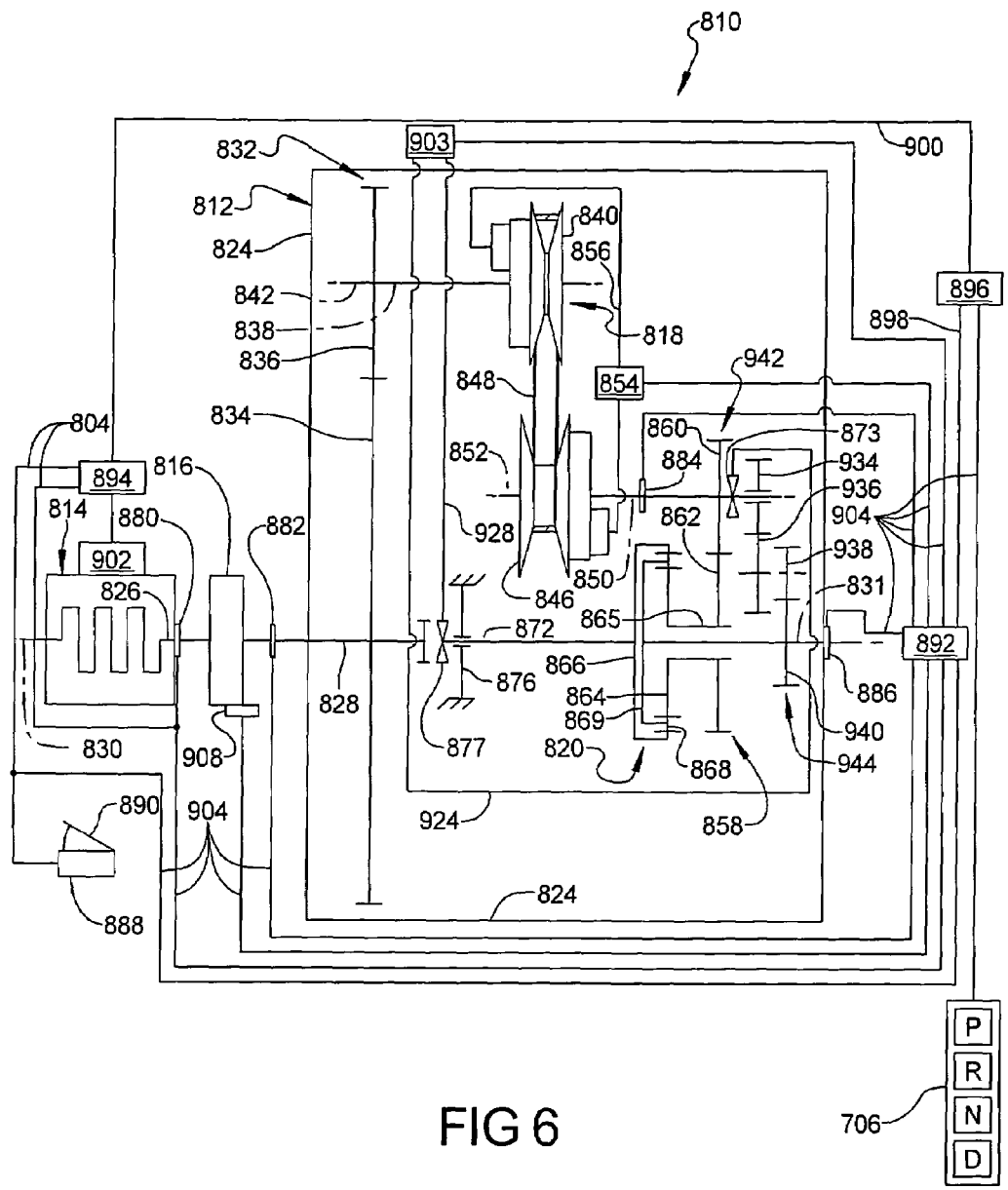
FIG. 6 is a schematic diagram of a fifth embodiment of a drivetrain system including an engine and a CVT.

FIG. 6 shows a fifth embodiment of the invention. Except as indicated otherwise, the elements of the fifth embodiment are common with those of the first embodiment. All reference numerals in FIG. 6 correspond to elements having the same names as the elements in FIG. 1, except that the reference numerals in FIG. 6 are greater by 800, unless otherwise indicated. A three-position jaw clutch 877 replaces mode clutch mechanism 71, including brakes 77 and 75. Jaw clutch 877 selective rotatively locks connecting shaft 872 with one of input shaft 828 and grounded hub 876. Jaw Clutch 877 can of course be placed in the neutral condition where it engages neither. Jaw clutch 873 has two positions: engaged, in which it drivingly connects connecting shaft 850 with output shaft 831 via first and second stage reverse gear sets 942 and 944, and disengaged in which gear 934 is able to freewheel on connecting hub 850.

Gear 934 is the drive gear of first stage reverse gear set 942. Gear 934 meshes with first stage reverse driven gear 936. Second stage reverse drive gear 938 is fixed to a common idler shaft and rotates as a unit with first stage reverse driven gear 936 about an axis parallel to axis 830. Second stage reverse drive gear 938 meshes with second stage reverse driven gear 940. Second stage reverse driven gear 940 is fixed to and rotates as a unit with output shaft 831. Both first stage reverse gear set 942 and second stage reverse gear set 944 increase torque. Together, gear sets 944, 942 provide more torque multiplication than is possible within the practical limits of a single gear set. Gear sets 942 and 944 in combination provide a very deep gear reduction to enable creeping operation at low vehicle speeds. Table 5, below, shows the operating modes achieved as a function of the condition of clutches 877 and 873.

TABLE 6

| Condition of | | Resulting |
|---|---|---|
| Brake 877 | Brake 873 | Operating Mode |
| Neutral | Disengaged | Neutral |
| Neutral | Engaged | Variator Only - Low Speed Reverse |
| Grounded Hub engaged | Disengaged | Variator Only - Medium Speed Forward |
| Input Shaft | Disengaged | Power Splitting - High Speed Forward |

The Neutral mode is established by placing clutch 877 in the neutral position, and clutch 873 in the disengaged position. Having clutch 877 in the neutral position prevents the transmission of any torque from shaft 828 to ring gear 866. With clutch 873 in the disengaged position, variator 818 is unable to transfer any torque. The inertia of the vehicle will resist and input from sun gear 864, but ring gear 866 will not. The rotation of sun gear 864 will be transferred to planet gears 868, and then to ring gear 866 which will freewheel.

In the Variator Only-Low Speed Reverse mode—the only reverse mode—clutch 877 is left in the Neutral position, and clutch 873 is engaged with gear 934. With clutch 877 in the Neutral position, all of the power passes through variator 818. Ring gear 866, and thus sun gear 864, are able to freewheel. All of the power out of variator 818 is transferred via shaft 850 through clutch 873 to gear 934. Gear 934 is the drive gear of the first stage reverse gear set 942. Gear 934 meshes with first stage reverse driven gear 936. Second stage reverse drive gear 938 is fixed to a common idler shaft and rotates as a unit with first stage reverse driven gear 936 about an axis parallel to axis 830. Second stage reverse drive gear 938 meshes with second stage reverse driven gear 940. Second stage reverse driven gear 940 is fixed to and rotates as a unit with output shaft 831. Both first stage reverse gear set 942 and second stage reverse gear set 944 increase torque. Together, gear sets 944 and 942 provide more torque multiplication than is possible within the practical limits of a single gear set. Gear sets 942 and 944 in combination provide a very deep gear reduction to enable reverse creeping operation at low vehicle speeds.

The Drive mode incorporates the two separate forward submodes laid out in Table 6. The first of these is the Variator Only—Medium Speed Forward mode which is achieved with clutch 877 engaging grounded hub 877 and clutch 873 in the disengaged condition. With clutch 877 and therefore ring gear 866 fixed to ground, ring gear 866 becomes a reaction member, and all of the power still passes entirely through variator 818. With clutch 873 open, and ring gear 866 fixed to ground, power from variator 818 is transferred entirely to shaft 831 via carrier 864. With ring gear 866 fixed, planetary mixer gear set 820 serves as a speed reducer as in the Variator Only-Low Speed mode of the first embodiment.

The Power Splitting—High Speed Forward mode is achieved with clutch 877 engaging input shaft 828, and clutch 873 in the disengaged condition. With clutch 877 locking input shaft 828 to shaft 872, transmission 812 operates in a power splitting mode, with part of the power from engine 814 going through shaft 872 to ring gear 866 and part through variator 818 to sun gear 864. Planetary mixer gear set 820 combines the torque and transfers it to output shaft 831 in the same manner as in the Power Splitting mode of the first embodiment.

The fifth embodiment of the invention operates in essentially the same manner as the first embodiment of the invention, except that a controller 903 is used to control jaw clutch 877 as well as jaw clutch 873 via actuating elements 928 and 924 respectively. With the use of jaw clutches 877 and 873, it is not possible to power shift. Controller 903 is connected to ECU 892 and is responsive to commands therefrom. Transmission 812 starts off from a stop in the Variator Only-Low Speed Forward mode. With sufficient speed, or perhaps a determination that less than maximum torque is needed to launch the vehicle, Transmission 812 shifts to Variator Only—Medium Speed Forward mode. Finally, transmission 812 shifts to the Power Splitting—High Speed Forward mode for cruising.

The present invention is not limited by the preceding description of a specific embodiment of the invention. The scope of the invention is set forth in the claims appended hereto.

We claim:

1. A dual mode continuously variable transmission for use with motor vehicles comprising:

a transmission input shaft;

a transmission output shaft;

a variator disposed between the transmission input shaft and the transmission output shaft and the variator having a variator input shaft and a variator output shaft and configured to continuously vary a ratio of input torque to output torque between the variator shafts responsive to commands from an electronic control unit, the variator input shaft drivingly connected to the transmission input shaft and the variator output shaft drivingly connected to the transmission output shaft;

a planetary mixer gear set operably disposed between the transmission input shaft and the variator output shaft including a ring gear rotatable about a first axis, a sun gear rotatable about the first axis and drivingly connected to the variator output shaft, and a carrier drivingly connected to the transmission output shaft and rotatable about the first axis with a plurality of planet gears in mesh with both the sun gear and the ring gear;

a grounded element rotatively fixed relative to a transmission housing;

a first clutching device operably disposed between the transmission input shaft and the ring gear and configured to selectively connect the input shaft with the ring gear to achieve a power splitting mode of operation;

a second clutching device operably disposed between the ring gear and the grounded element and configured to selectively connect the ring gear and the grounded element to achieve a variator-only mode of operation; and the electronic control unit operably connected to the variator and operably connected to the clutching elements and configured to include logic rules for controlling the transmission, the logic rules including rules by which the clutching element maintains the transmission in the variator-only mode of operation in a first vehicle speed range and maintains the transmission in the power splitting mode of operation in a second vehicle speed range greater than the first vehicle speed range.

2. A dual mode continuously variable transmission as claimed in claim 1 wherein the first and second clutching devices are integrated into a mode clutch mechanism having a first brake and a second brake for selectively engaging the grounded element and the input shaft respectively.

3. A dual mode continuously variable transmission as claimed in claim 1 wherein the transmission further includes a connecting shaft to which the ring gear is fixed and to which both the first and the second clutching devices are fixed, the first and second clutching devices being axially separate from each other.

4. A dual mode continuously variable transmission as claimed in claim 1 wherein a planetary locking clutch selectively locks the sun gear to the carrier for unitary rotation thereof.

* * * * *